United States Patent
Yanagita et al.

(10) Patent No.: US 7,834,330 B2
(45) Date of Patent: Nov. 16, 2010

(54) RADIATION IMAGE CONVERSION PANEL AND PREPARATION METHOD THEREOF

(75) Inventors: Takafumi Yanagita, Tokyo (JP); Tadashi Arimoto, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 273 days.

(21) Appl. No.: 11/909,428

(22) PCT Filed: Mar. 22, 2006

(86) PCT No.: PCT/JP2006/305659

§ 371 (c)(1), (2), (4) Date: Sep. 21, 2007

(87) PCT Pub. No.: WO2006/109460

PCT Pub. Date: Oct. 19, 2006

(65) Prior Publication Data

US 2009/0078887 A1    Mar. 26, 2009

(30) Foreign Application Priority Data

Mar. 31, 2005  (JP)  ............... 2005-101151

(51) Int. Cl.
*H05B 33/00* (2006.01)

(52) U.S. Cl. ............ 250/484.4; 427/65; 427/69; 427/72; 250/361 R; 250/483.1

(58) Field of Classification Search ............ 250/484.4, 250/361 R, 483.1; 427/65, 69, 72
See application file for complete search history.

(56) References Cited

U.S. PATENT DOCUMENTS

| 5,252,831 | A | * | 10/1993 | Weiss | 250/370.11 |
| 5,736,069 | A | * | 4/1998 | Willems et al. | 252/301.4 H |
| 2002/0043627 | A1 | * | 4/2002 | Bergh | 250/462.1 |
| 2004/0056209 | A1 | * | 3/2004 | Maezawa et al. | 250/484.4 |
| 2005/0077480 | A1 | * | 4/2005 | Kishinami et al. | 250/484.4 |
| 2005/0104010 | A1 | * | 5/2005 | Maezawa et al. | 250/484.4 |
| 2007/0205371 | A1 | * | 9/2007 | Inoue | 250/370.11 |

FOREIGN PATENT DOCUMENTS

| JP | 2000298321 | 10/2000 |
| JP | 2002181997 | 6/2002 |
| JP | 2004-012282 | 1/2004 |

* cited by examiner

*Primary Examiner*—David P Porta
*Assistant Examiner*—Jessica L Eley
(74) *Attorney, Agent, or Firm*—Lucas & Mercanti, LLP

(57) ABSTRACT

There is provided a radiation image conversion panel having strong resistance to physical impact, and in which enhanced sharpness and adhesion are balanced, especially, enhanced adhesion of a photostimulable phosphor layer onto a support is achieved, and a preparation method of the radiation image conversion panel. The radiation image conversion panel comprising on a support a sublayer and at least one photostimulable phosphor layer in this order from the support, featured in that the photostimulable phosphor layer is formed by a gas phase method and has a thickness of not less than 50 μm, and the sublayer comprises a thermoplastic resin and the thickness of the central portion in an image area of the sublayer is greater than that of the peripheral portion of the image area.

8 Claims, 1 Drawing Sheet

RADIATION IMAGE CONVERSION PANEL AND PREPARATION METHOD THEREOF

TECHNICAL FIELD

The present invention relates to a radiation image conversion panel employing a photostimulable phosphor and a preparation method thereof.

TECHNICAL BACKGROUND

Recently, there have been used radiographic-imaging methods by using a radiation image conversion panel employing a photostimulable phosphor.

The photostimulable phosphor layer of a radiation image conversion panel for use in these radiographic-imaging methods requires high radiation absorbance and light conversion rate, superior image graininess and enhanced sharpness.

There have been conducted studies of controlling plural factors relating to sensitivity and image quality to achieve improved sensitivity and image quality. Specifically, there has been attempted controlling the shape of the formed photostimulable phosphor as a means for improving sharpness of radiation images, thereby achieving improvements in sensitivity and sharpness.

As one of such attempts is disclosed, for example, in JP-A No. 61-142497 a method of using a photostimulable phosphor layer formed by depositing a photostimulable phosphor on a support having a finely indented surface pattern and comprised of pseudo-columnar blocks (hereinafter, the term JP-A refers to Japanese Patent Application Publication).

Further, there were proposed a method of using a radiation image conversion panel comprised of a photostimulable phosphor layer formed by subjecting cracks between columnar blocks obtained by depositing a photostimulable phosphor on a support having a microscopic pattern to a shock treatment and developing them, as described in JP-A No. 61-142500; a method of using a radiation image conversion panel comprising a photostimulable phosphor layer formed on the surface of a support, in which cracking was caused on the phosphor layer surface to form pseudo-columns, as described in JP-A No. 62-39737; and a method in which a photostimulable phosphor layer having voids was formed by deposition on the surface of a support, followed by being subjected to a heating treatment to grow the voids to form cracks, as described in JP-A No. 62-110200.

There was also proposed a radiation image conversion panel comprising a photostimulable phosphor layer in which spindly columnar crystals were formed through vapor phase deposition on a support (hereinafter, also denoted as a substrate), at a given inclination to the direction normal to the support (as described in, for example, patent document 1).

These attempts of controlling the form of the photostimulable phosphor layer are featured in that formation of a photostimulable phosphor layer comprised of columnar crystals can inhibit diffusion of stimulated light (stimulated emission) in the lateral direction (in which the stimulated light reaches the surface of a support after repeating reflection on the columnar crystal interface).

These radiation image conversion panels comprising a photostimulable phosphor layer formed by vapor phase growth (deposition) achieved an enhanced relationship between sensitivity and sharpness. Further, there was an attempt of combining the phosphor layer comprising columnar photostimulable phosphor crystals with a layer exhibiting a low refractive index, whereby reflection or refraction on the layer surface was inhibited and enhanced image quality was achieved (as described, for example, in patent document 2).

However, a phosphor layer comprised of columnar photostimulable phosphor crystals, in which spindly columnar crystals were formed on the substrate, often resulted in insufficient attachment (adhesiveness) onto the substrate and was easily peeled off, so that improved durability was desired. Specifically, the use of a highly reflective support tended to result in deteriorated adhesion (as described, for example, in patent document 3), so that when physical impact was applied, for instance, when the radiation image conversion panel was dropped, the phosphor layer was peeled off or tendency of causing cracking of the overall layer was marked.

Patent document 1: JP-A No. 2-58000
Patent document 2: JP-A No. 1-131498
Patent document 3: JP-A No. 2004-251883

DISCLOSURE OF THE INVENTION

Problem to be Solved

It is an object of the invention to provide a radiation image conversion panel having strong resistance to physical impact, and in which enhanced sharpness and adhesion are balanced, especially, enhanced adhesion of a photostimulable phosphor layer onto a support is achieved, and a manufacturing method of the radiation image conversion panel.

Means for Solving the Problem

As a result of extensive study by the inventors of this invention, the object of the invention was realized by the following constitutions.

1. A radiation image conversion panel comprising on a support at lest one sublayer and at least one photostimulable phosphor layer in that order from the support, wherein the photostimulable phosphor layer is formed by a gas phase method and has a thickness of not less than 50 μm, and the sublayer comprises a thermoplastic resin and a thickness of a central portion in an image area of the sublayer is greater than that of a peripheral portion of the image area.

2. The radiation image conversion panel as described in 1, wherein the thickness of the central portion is 3 to 50% greater than that of the peripheral portion.

3. The radiation image conversion panel as described in 1 or 2, wherein the photostimulable phosphor layer comprises columnar crystals of an alkali halide photostimulable phosphor.

4. The radiation image conversion panel as described in 3, wherein the columnar crystals of an alkali halide photostimulable phosphor comprise CsBr type columnar crystals.

5. A method of preparing a radiation image conversion panel as described in any one of 1 to 4, wherein a sublayer is formed by allowing a coating solution to drop onto a support and spin-coating the coating solution on the support through a centrifugal force.

In the radiation image conversion panel of the invention, the central portion of the sublayer being thicker than the peripheral portion thereof achieves enhanced adhesion of the photostimulable phosphor layer to the support (or substrate), leading to production of a radiation image conversion panel exhibiting stronger resistance to physical impact.

The foregoing central portion refers to a circular area accounting for 10% of the total area of the image area, on the basis of the center of gravity of the substrate. The foregoing peripheral portion refers to the region surrounded by the edge of the image region (or a boundary line between the image area and an area other than the image area) and an inner closed line, which is a strip-shaped region having a given width and accounts for 10% of an area of the image region. The image area refers to a region in which an image is formed in the radiation image conversion panel and a region forming the photostimulable phosphor layer.

FIG. 1 schematically illustrates a central portion 11, a peripheral portion 12 and an edge portion 13 of the image region (phosphor layer-coated region) of a radiation image conversion panel.

The layer thickness is measured at 20 arbitrarily chosen points in the respective portions and an average value of the measured thicknesses is defined as the thickness of the respective portions.

Measurement of layer thickness is not specifically limited and can be conducted in such a manner that a sublayer is removed by using a solvent and the difference between the sublayer and the substrate is measured by using a surface roughness meter (for example, SURFCOM 1400D, produced by TOKYO SEIMITSU). Alternatively, the sublayer on the substrate is intersected and its intersection is photographed using an electron microscope (for example, S800, produced by HITACHI SEISAKUSHO) to determine the layer thickness from the electron micrograph.

"Thickness of a central portion of the sublayer being greater than that of a peripheral portion" refers to the difference calculated by the following equation (difference of layer thickness) being 1% or more and the difference in layer thickness is preferably 3 to 50% in terms of impact resistance, resolving power and layer adhesion:

Difference of layer thickness (%)=[(layer thickness of the central portion)−(layer thickness of the peripheral portion)]/(layer thickness of the central portion)

Effect of the Invention

According to the invention, there can be provided a radiation image conversion panel having strong resistance to physical impact in which enhanced sharpness and adhesion are balanced, especially, enhanced adhesion of a photostimulable phosphor layer onto a support is achieved and a preparation method of the radiation image conversion panel.

DESCRIPTION OF DESIGNATIONS

Figure 1:
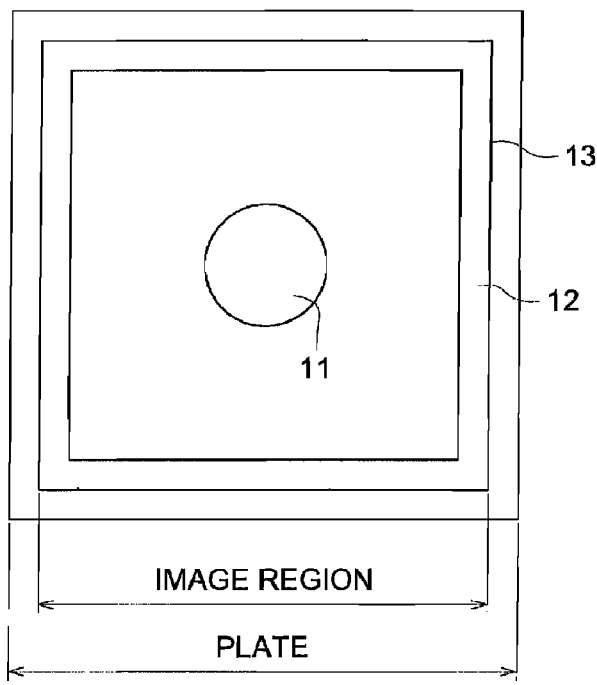
FIG. 1 illustrates a central portion, a peripheral portion and an image region of a radiation image conversion panel.

1: Vapor deposition apparatus
2: Vacuum chamber
3: Support rotation mechanism (Support rotation function)
4: Support
5: Vapor source
6: Support surface temperature control heater
11: Central portion
12: Peripheral portion
13: Edge portion of image region

PREFERRED EMBODIMENTS OF THE INVENTION

There will be described compounds, layer arrangement, manufacturing process and the like, as below.

Support (Substrate)

The support relating to the invention employs conventional materials for use in radiation image conversion panels, including, for example, aluminum, quartz glass, plastic resin and the like, but is preferably a metal plate mainly comprised of aluminum, CFRP or an aramid-laminated plate.

Sublayer (Intermediate Layer)

The sublayer (also denoted as intermediate layer) relating to the invention is a layer provided between the support and a photostimulable phosphor layer, for example, a polymer layer provided by a polymer-coat treatment of the support surface.

The thickness of the sublayer is preferably from 0.1 to 10 μm. When a sublayer is provided on the phosphor layer side of the support, the sublayer thickness preferably accounts for 0.1 to 20% of the total thickness of all constituting layers.

In the invention, at least one sublayer is comprised of a thermoplastic resin, in which the layer thickness of the central portion is greater than that of the peripheral portion.

Thermoplastic resin usable in the sublayer is not specifically limited and examples thereof include polyurethane, polyester, vinyl chloride type and polyvinyl butyral copolymer, vinyl chloride/vinyl acetate copolymer, vinyl chloride/vinylidene chloride copolymer, vinyl chloride/acrylonitrile copolymer, butadiene/acrylonitrile copolymer, polyamide resin, polyvinyl butyral, cellulose derivatives (e.g., nitrocellulose), styrene/butadiene copolymer, various kinds of synthetic rubber type resins, phenol resin, epoxy resin, urea resin, melamine resin, phenoxy resin, silicone resin, acryl resin and urea-formamide resin. Of these are preferred polyurethane, polyester, vinyl chloride type copolymer, and polyvinyl butyral. Examples of polyurethane include SANPREN series, produced Sanyo Chemical Industries Ltd. and TAKENATE series, produced by Takeda Yakuhin Kogyo Co., Ltd. Examples of polyester resin include BIRON series, produced by TOYOBO Co. Thermoplastic resin(s) used in the sublayer preferably has an average glass transition temperature (Tg) of 20 to 200° C.

There is not specifically limited a method of coating these resins on a support so that the layer thickness of the central portion in the image area is greater than that of the peripheral portion. The sublayer is formed preferably in such a manner that the coating solution is dropwise added onto a support and spin-coated by employing a centrifugal force. For example, a sublayer having an appropriate layer thickness distribution can be formed using a spin coater with controlling the rotation number and the viscosity of the coating solution.

When coating by a spin coater, the viscosity of the coating solution and the rotating speed of the coater are controlled to render the central portion thicker. Thus, it is essential that the viscosity of the coating solution fall within the range of 5 to 100 mPa·s and the rotating speed of the spin coater fall within the range of 200 to 1000 rpm. It is preferred to reach the designated rotating speed within 10 sec.

There is no problem in use of commercially available spin coaters.

A coating solution used for spin-coating uses a solvent capable of solubilizing thermoplastic resin as described above and may contain a coating aid such as a surfactant.

There are preferably used crosslinking agents to form the sublayer relating to the invention. It is preferred that the crosslinking agents undergo crosslinking during or after coating to form a thermoplastic resin layer. Examples of a crosslinking agent include a polyisocyanate compound and its derivatives, a melamine and its derivatives, and an amino resin and its derivatives. Of these, a polyisocyanate compound is preferred, such as CORONATE HX and CORONATE 3041, produced by Nippon Polyurethane Ind. Co., Ltd.

At least two of the foregoing thermoplastic resins (binders) may be used in combination. The sublayer may be formed of a multilayer structure.

Photostimulable Phosphor Layer

The photostimulable phosphor layer is preferably constituted of at least one layer of columnar crystals of an alkali halide photostimulable phosphor. The expression "being constituted of" means that the photostimulable phosphor layer, which may contain other components, contains, as a main component, columnar crystals of an alkali halide photostimulable phosphor and it also means that the columnar crystals account for at least 50% by mass of the overall photostimulable phosphor layer.

An alkali halide photostimulable phosphor is not specifically limited but is preferably one which is represented by the following formula (1):

$$M^1X \cdot aM^2X'_2 \cdot bM^3X''_3 : eA \qquad \text{formula (1)}$$

wherein $M^1$ is at least one alkali metal atom selected from the group consisting of Li, Na, K, Rb and Cs;

$M^2$ is at least one divalent metal atom selected from the group consisting of Be, Mg, Ca, Sr, Ba, Zn, Cd, Cu and Ni;

$M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X', and X'' are each at least one halogen atom selected from the group consisting of F, Cl, Br and I atoms;

A is at least one metal selected from the group consisting of Eu, Tb, In, Ce, Tm, Dy, Pr, Ho, Nd, Yb, Er, Gd, Lu, Sm, Y, Tl, Na, Ag, Cu and Mg; and a, b and e are $0 \leq a < 0.5$, $0 \leq b < 0.5$ and $0 < e \leq 0.2$, respectively.

There will be preferred photostimulable phosphors represented by the foregoing formula (1).

In the photostimulable phosphors represented by the formula (1), $M^1$ is at least one alkali metal atom selected from atoms of Li, Na, K, Rb and Cs, preferably at least one alkali metal atom selected from atoms of Rb and Cs, and more preferably a Cs atom.

$M^2$ is at least one divalent metal atom selected from atoms of Be, Mg, Ca, Sr, Ba, Zn, Cd, Cu and Ni, and preferably at least one divalent metal atom selected from atoms of Be, Mg, Ca, Sr and Ba.

$M^3$ is at least one trivalent metal atom selected from atoms of Sc, Y, La, Ce, Pr, Nd, Pm, Sm, Eu, Cd, Tb, Dy, Ho, Er, Tm, Yb, Lu, Al, Ga and In, and preferably at least one trivalent metal atom selected from atoms of Y, Ce, Sm, Eu, Al, La, Gd, Lu, Ga and In.

A is at least one metal selected from atoms of Eu, Tb, In, Ce, Tm, Dy, Pr, Ho, Nd, Yb, Er, Gd, Lu, Sm, Y, Tl, Na, Ag, Cu and Mg. Of these, a Eu metal atom is preferred.

X, X', and X'' are each at least one halogen atom selected from F, Cl, Br and I atoms in terms of enhanced luminance of stimulated emission of a photostimulable phosphor, preferably at least one halogen atom selected from F, Cl and Br atoms, and more preferably at least one halogen atom selected from Br and I atoms.

Of these photostimulable phosphors used in the invention is preferred a CsBr type photostimulable phosphor, for example, CsBr:Eu.

The photostimulable phosphor of the invention, represented by formula (1) can be manufactured by, for example, a manufacturing method described below.

There are used, as phosphor raw materials, (a) at least one compound selected from NaF, NaCl, NaBr, NaI, KF, KCl, KBr, KI, RbF, RbCl, RbBr, RbI, CsF, CsCl, CsBr and CsI;

(b) at least one compound selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuGF_2$, $CuCl_2$, $CuBr_2$, $CuI_2$, $NiF_2$, $NiCl_2$, $NiBr_2$ and $NiI_2$; and (c) one or more compounds selected from $AlCl_3$, $GaBr_3$ and $InCl_3$.

(d) As an activating member is used a compound containing a metal atom selected from atoms of Eu, Tb, In, Cs, Ce, Tm, Dy, Pr, Ho, Nd, Yb, Er, Gd, Lu, Wm, Y, Ti, Na, Ag, Cu and Mg.

In the compound of formula (1), $0 \leq a < 0.5$ and preferably $0 \leq a < 0.01$, $0 \leq b < 0.5$ and preferably $0 \leq b \leq 10^{-2}$, and $0 < e \leq 0.2$ and preferably $0 < e \leq 0.1$.

To obtain the foregoing photostimulable phosphor, phosphor raw materials of (a)-(d) described above are weighed so as to form a mixture composition falling within the prescribed numerical value region and sufficiently mixed by using a mortar, a ball mill or a mixer mill.

The photostimulable phosphor layer of the invention is formed through a gas phase method (also called gas phase deposition method).

Examples of a gas phase method to form a photostimulable phosphor layer include a vapor deposition method, a sputtering method, a CVD method and an ion plating method.

In the invention, there are cited, for example, the following methods.

Firstly, in the vapor deposition method, a support is set within a deposition apparatus and the inside of the apparatus is evacuated up to a degree of vacuum of approximately $1.333 \times 10^{-4}$ Pa.

Subsequently, at least one of the foregoing photostimulable phosphors is vaporized with heating by a method such as resistance heating method or an electron beam method to grow a photostimulable phosphor of a desired thickness on the surface of a support as described above.

As a result, there is formed a photostimulable phosphor layer. The foregoing vapor deposition step may be divided into plural times to form the photostimulable phosphor layer.

Alternatively, co-deposition may be conducted using plural resistance heaters or electron beam means in the vapor deposition step to perform synthesis of the targeted photostimulable phosphor, concurrently with formation of the photostimulable phosphor layer.

After completion of deposition, a protective layer is optionally provided on the side opposite the support of the photostimulable phosphor layer, whereby a radiation image conversion panel is prepared. There may be conducted formation of a photostimulable phosphor layer on a protective layer, followed by being provided with a support.

In the vapor deposition method, the material subject to deposition (support, protective layer or intermediate layer) may be cooled or heated during deposition.

Further, after completion of deposition, the photostimulable phosphor layer may be subjected to a heating treatment. Gas such as $O_2$ or $H_2$ may be introduced during the deposition stage to perform reactive deposition.

Secondly, in the sputtering method, similarly to the vapor deposition method, a support having a protective layer or an intermediate layer is placed in the sputtering apparatus and the inside of the apparatus is evacuated to a degree of vacuum of approximately $1.333 \times 10^{-4}$ Pa. Subsequently, an inert gas Ar or Ne used for sputtering is introduced into the sputtering apparatus and a gas pressure is maintained approximately at $1.333 \times 10^{-4}$ Pa. Then a photostimulable phosphor as a target is sputtered to grow a photostimulable phosphor layer up to the desired thickness.

Similarly to the vapor deposition method, various treatments are applicable to the sputtering method.

There are a CVD method as a third method and an ion plating method as a fourth method.

The growth rate of a photostimulable phosphor layer in the gas phase growth described above is preferably from 0.05 to 300 μm/min in terms of productivity of a radiation image conversion panel and control of the growth rate.

When obtaining a radiation image conversion panel by the above-described vacuum deposition method or sputtering method, no existence of a binder results in increased filling density of the photostimulable phosphor, whereby a radiation image conversion panel exhibiting preferable sensitivity and resolving power is obtained.

A crucible for use in vapor deposition is variable, depending on the heating system such as a resistance heating system, a halogen heating system or an EB (electron beam) system.

A thickness of the photostimulable phosphor layer is variable, depending on the intended use of the radiation image conversion panel and the kind of a photostimulable phosphor, but is at least 50 μm to achieve effects set forth in the invention, in which the upper limit is not specifically limited but is preferably about 1 mm, and the layer thickness is preferably from 50 to 800 μm.

In the invention, the space between columnar crystals may be filled with a filling material such as a binder, whereby the photostimulable phosphor layer becomes more durable. It may also be filled with a highly light-absorbing material or a highly light-reflective material, whereby not only the strengthening effect described above is achieved but it is also effective in reduction of lateral diffusion of stimulating light incident to the photostimulable phosphor layer.

The highly light-reflective material refers to a material exhibiting a high reflectance with respect to stimulating light (500-900 nm, specifically, 600-800 nm) and examples thereof include aluminum, magnesium, silver, indium and other metals, white pigments and coloring materials in the range of green to red. White pigments can also reflect stimulated emission.

Examples of white pigments include $TiO_2$ (anatase type, rutile type), MgO, $PbCO_3 \cdot Pb(OH)_2$, $BaSO_4$, $Al_2O_3$, M(II)FX [in which M(II) is at least one atom selected from Ba, Sr and Ca, and X is a Cl or Br atom], $CaCO_3$, ZnO, $Sb_2O_3$, $SiO_2$, $ZrO_2$, lithopone ($BaSO_4 \cdot ZnS$), magnesium silicate, basic silisulfate, basic lead phosphate and aluminum silicate.

These white pigments, which exhibit a strong covering power and a high refractive index, easily scatter stimulated emission through reflection or refraction, resulting in enhanced sensitivity of a radiation image conversion panel.

Examples of a highly light-absorbing material usable in the invention include carbon black, chromium oxide, nickel oxide, iron oxide and the like, and blue coloring materials.

Coloring materials may be either organic or inorganic colorants.

Examples of an organic colorant include Zabon Fast Blue 3G (produced by Hoechst), Estrol Bril Blue N-3RL (produced by Sumitomo Kagaku Co., Ltd.), D & C Blue No. 1 (National Aniline Co.), Spirit Blue (produced by HODOGAYA KAGAKU Co., Ltd.), Oil Blue No. 603 (Produced by Orient Co.), Kiton Blue A (produced by Ciba Geigy Co.), Eisen Catilon Blue GLH (produced by HODOGAYA KAGAKU Co., Ltd.), Lake Blue AFH (produced by KYOWA SANGYO Co., Ltd.), Primocyanine 6GX (produced by Inahata Sangyo Co., Ltd.), Brilacid Green 6BH (produced by HODOGAYA KAGAKU Co., Ltd.), and Lyonoyl Blue SL (Produced by Toyo Ink Co., Ltd.).

There are also cited organic metal complex colorants such as Color Index Nos. 24111, 23160, 74180, 742000, 23154, 23155, 24401, 14830, 15050, 15760, 15707, 17941, 74220, 13425, 13361, 13420, 11836, 74140, 74380, 74350, and 74460.

Examples of an inorganic colorant include cobalt blue, celurean blue, chromium oxide and $TiO_2$—ZnO—Co—NiO type pigments.

To deposit a photostimulable phosphor layer, it is preferred that a sublayer is coated on a support and dried, followed by formation of the photostimulable phosphor layer on the support by various deposition methods.

Figure 2:
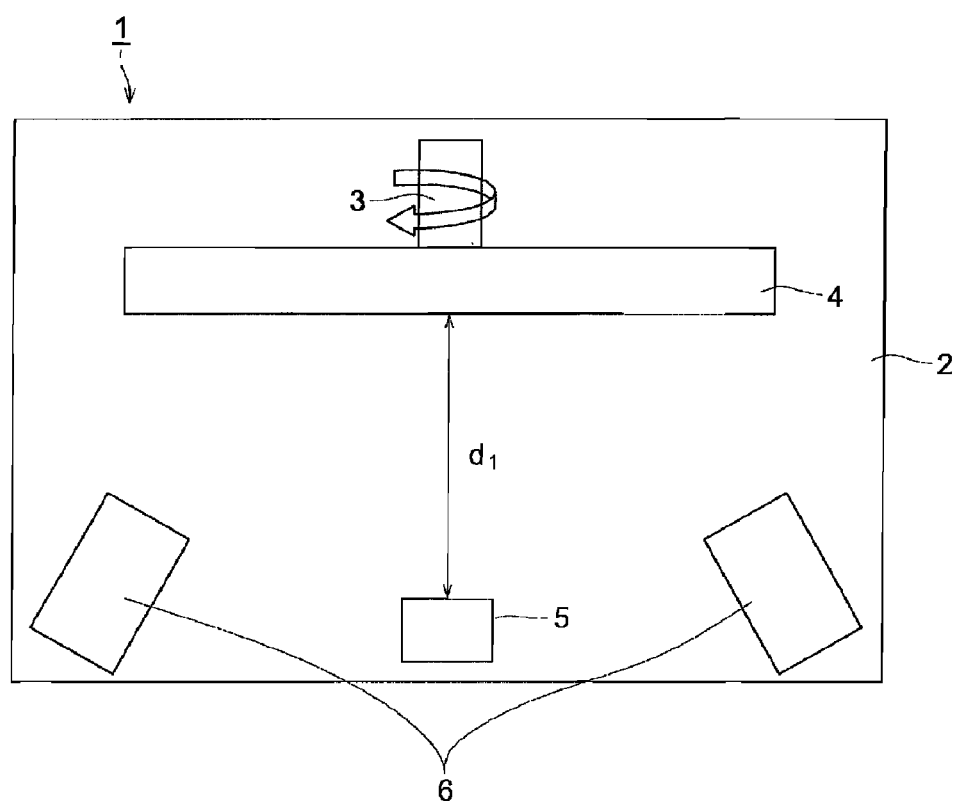
FIG. 2 illustrates an example of a vapor deposition apparatus for use in formation of a photostimulable phosphor layer of the invention.

Typically, a vapor deposition apparatus, as shown in FIG. 2 are used for formation of a photostimulable phosphor layer through a gas phase growth method.

In FIG. 2, the numeral 1 designates a vapor deposition apparatus, the numeral 2 designates a vacuum chamber, the numeral 3 designates a support rotation mechanism (support rotation function), the numeral 4 designates a support, the numeral 5 designates a vaporization source, and the numeral 6 designates a support surface temperature-controlling heater. The designation $d_1$ represents the distance between the support 4 and the vaporization source.

Protective Layer

The photostimulable phosphor layer of the invention may optionally have a protective layer.

A protective layer may be formed by coating a coating solution of a protective layer on the photostimulable phosphor layer or a previously formed protective layer may be provided on the photostimulable phosphor layer. Alternatively, on a separately formed protective layer is formed the photostimulable phosphor layer, which is further provided with a support.

Materials conventionally used for a protective layer are employed for the protective layer of the invention, including, for example, cellulose acetate, nitrocellulose, polymethyl methacrylate, polyvinyl butyral, polyvinyl formal, polycarbonate, polyester, polyethylene terephthalate, polyethylene, polyvinilidene chloride, nylon, polytetrafluoroethylene, polytrifluoromonochloroethylene, tetrafluoroethylene-hexafluoropropylene copolymer, vinylidene chloride-acrylonitrile copolymer and vinylidene chloride-acrylonitrile copolymer. There may also be employed a transparent glass substrate as a protective layer.

The protective layer may be formed by lamination of inorganic material such as SiC, $SiO_2$, SiN or $Al_2O_3$ through a vapor deposition method or a sputtering method.

The thickness of the protective layer is preferably from 0.1 to 2000 μm.

Usage of Radiation Image Conversion Panel

The emission wavelength of a photostimulable phosphor used in the invention is in the range of 300 to 500 nm, while the stimulation wavelength is often in the range of 500 to 900 nm. With recent progress of downsizing of diagnosis apparatuses, there are preferred semiconductor lasers which exhibits a high output at a stimulating wavelength used for reading images of a radiation image conversion panel and easily achieves compactness. A wavelength of such a laser light is often 680 nm. A photostimulable phosphor built in the radiation image conversion panel of the invention exhibits superior sharpness at a stimulating wavelength of 680 nm.

Photostimulable phosphors used in the invention exhibit emission having a main peak at a wavelength of 500 nm, which is easily separable from stimulating light and is consistent with the spectral sensitivity of a receiver, resulting in efficiently receiving light, whereby enhanced sensitivity of an image receiving system is achieved.

Examples of a laser light include He—Ne laser, He—Cd laser, Ar ion laser, Kr ion laser, $N_2$ laser, YAG laser, other second harmonics, ruby laser, semiconductor lasers, various dye lasers, and metal vapor lasers such as copper vapor laser. Usually, a continuous oscillation laser such as a He—Ne laser or Ar ion laser is desirable but if the scanning time per pixel of the panel is synchronized with a pulse, pulse oscillation laser is also usable.

In a separation method employing delayed emission, as disclosed in JP-A No. 59-22046, modulation using a pulse oscillation laser is preferred rather than one using a continuous oscillation laser.

Among various types of laser light sources, a semiconductor laser, which is compact, low-price and requires no modulator, is specifically preferred.

In the case of a practically preferred combination of a stimulating wavelength of 500 to 900 nm and a stimulated emission wavelength of 300 to 500 nm, for instance, there are usable ultraviolet to blue glass filters such as C-39, C-40, V-40, V-42 and V-44 (each, produced by TOSHIBA Co.); 7-54 and 7-59 (produced by Corning Glass Co.); BG-1, BG-3, BG-25, BG-37, and BG-38 (each, produced by Spectro Film Co.). The use of an interference filter can optionally choose characteristic filters to some extents. There are usable any photoelectric conversion apparatus which can convert a light quantity change to an electric signal change, for example, a photoelectric tube, a photomultiplier, a photodiode, a phototransistor and a photoconductive cell.

EXAMPLES

The invention will be described with reference to specific examples but embodiments of the invention are by no means limited to these.

Examples

Preparation of Radiation Image Conversion Panel 1-12

A sublayer coating solution in which a polyester resin (Biron series, produced by Toyobo Co., Tg: 60° C.) was dissolved in mixed solvents of methyl ethyl ketone/toluene (1/1 by weight) was coated on the surface of a 0.5 mm thick aluminum plate support (exhibiting an average surface roughness of 0.02 μm) by a spin coater and dried in hot air heated at 70° C.

Subsequently, a 200 μm photostimulable phosphor layer by using a photostimulable phosphor (CsBr:Eu) in a vapor deposition apparatus shown in FIG. 2.

After evacuating the inside of a vacuum chamber, Ar gas was introduced thereto and controlled to a degree of vacuum of $1.0 \times 10^{-2}$ Pa and vapor deposition was performed with maintaining a support surface temperature at 100° C. until reached a phosphor layer thickness of 400 μm, whereby a radiation image conversion panel was prepared.

In the vapor deposition apparatus shown in FIG. 2, a vapor deposition source was disposed on the vertical line crossing the center of the support and the distance between the support and the vapor deposition source was $d_1$ (60 cm). Vapor deposition was performed, while rotating the support.

Subsequently, the surface of the photostimulable phosphor layer was covered with a thin layer (a thickness of 2.0 μm) of copolymer of tetrafluoroethylene and hexafluoroethylene, as a protective layer. The circumferential portion of the support and the protective layer was sealed with an adhesive in a dry air environment to obtain a radiation image conversion panel sample 1, having an airtight phosphor layer structure.

Radiation image conversion panel samples 2-6 (samples Nos. 2-6) were prepared similarly to radiation image conversion panel sample 1 (sample No. 1), except that the layer thickness distribution (the difference in thickness between the center and the peripheral portion of the image region) was varied.

In the preparation, the distribution of sublayer thickness was varied with controlling the rotating speed of a spin coater.

There were thus prepared radiation image conversion panel samples 1-6 and radiation image conversion panel samples 7-12 (samples Nos. 7-12) were also similarly prepared, except that the resin used for the sublayer was varied to a polyurethane resin (SANPRENE series, produced by Sanyo Kasei Co., Tg: 45° C.).

Evaluation of Performance Characteristics:
Evaluation was made with respect to the following items.

Resistance to Impact:
The surface of a radiation image conversion panel sample was reticulately cut by a razor to a depth reaching the support surface (edge length: 6.0 cm) and the panel was allowed to fall from a height of 60 cm to a concrete floor to subject it to impact.

Evaluation was made based on the following five grades with respect to the area of damage (cracking or swelling of the layer):

1: damage was observed in an area of 100%,
2: damage was observed in an area of not less than 50% and less than 100%,
3: damage was observed in an area of not less than 20% and less than 50%,
4: damage was observed in an area of not less than 5% and less than 20% (strong adhesion),
5: damage was observed in an area of less than 5% (very strong adhesion).

Sharpness:
The modulation transfer function (MTF) was determined and evaluated with respect to sharpness, as below.

A CTF chart was adhered to each of radiation image conversion panel samples and after being exposed to 10 mR of X-rays at 80 kVp (distance to object: 1.5 m), the phosphor layer side A was exposed to semiconductor laser light (690 nm, power on the panel: 40 mW). The CTF chart was read by scanning with a semiconductor laser of a 100 μm diameter. MTF values shown in Table 1 are represented by a relative value, based on the MTF value of radiation image conversion panel 1 at 0.5 lp/mm being 100.

Luminance:
There was measured stimulated emission intensity.
Thus, the overall surface of a radiation image conversion panel was exposed to X-rays at a tube voltage of 80 kVp. The panel was stimulated by scanning with a semiconductor laser (680 nm) of 100 mW. The stimulated emission emitted from the phosphor layer was received by a photomultiplier (photomultiplier R1305, produced by Hamamatsu Photonics Co.), converted to electric signals, subjected to analog-to-digital conversion and recorded on a magnetic tape.

The recorded magnetic disc was analyzed by a computer and the stimulated emission intensity was determined from signal values of a planar image recorded on the hard disc.

Results were represented by relative values, based on the luminance of sample 1 being 100.

Adhesion:

The surface of a radiation image conversion panel sample was cross-cut by a razor to an extent of reaching the support surface. Cellotape (trade name) was adhered thereto and then peeled abruptly. Adhesion was evaluated based on the peeled away area, according to the following five grades:
1: adhesion was very poor and an area of 100% was completely peeled,
2: an area of not less than 50% and less than 100% was peeled,
3: an area of not less than 20% and less than 50% was peeled,
4: adhesion was enhanced and an area of not less than 5% and less than 20% was peeled,
5: adhesion was greatly enhanced and an area of less than 5% or no area was peeled.

In the foregoing, grades 4 or more are regarded as sufficient adhesion for practice.

Evaluation results of samples 1-12 are shown in Table 1.

TABLE 1

| Sample No. | Layer Thickness Distribution (%) | Performance | | | | Remark |
| --- | --- | --- | --- | --- | --- | --- |
| | | Impact Resistance | MTF (%) | Luminance | Adhesion | |
| 1 | 0 | 3 | 100 | 100 | 3 | Comp. |
| 2 | 30 | 5 | 100 | 100 | 5 | Inv. |
| 3 | 10 | 5 | 100 | 100 | 5 | Inv. |
| 4 | 50 | 5 | 100 | 100 | 5 | Inv. |
| 5 | 100 | 4 | 95 | 100 | 4 | Inv. |
| 6 | −50 | 1 | 95 | 100 | 1 | Comp. |
| 7 | 0 | 3 | 100 | 100 | 3 | Comp. |
| 8 | 2.5 | 4 | 100 | 100 | 5 | Inv. |
| 9 | 10 | 5 | 100 | 100 | 5 | Inv. |
| 10 | 40 | 5 | 100 | 100 | 5 | Inv. |
| 11 | 60 | 4 | 95 | 100 | 4 | Inv. |
| 12 | −30 | 1 | 95 | 100 | 1 | Comp. |

As apparent from Table 1, it was proved that inventive samples were superior specifically in impact resistance to comparative samples and were also equal to or higher in other performance than comparative samples.

What is claimed is:

1. A radiation image conversion panel comprising: on a support, a sublayer, and at least one phosphor layer in this order from the support; wherein, the phosphor layer is formed by a gas phase method and has a thickness of not less than 50 μm, and the sublayer comprises a thermoplastic resin and a thickness of a central portion in an image area of the sublayer is greater than that of a peripheral portion of the image area.

2. The radiation image conversion panel of claim 1, wherein the thickness of the central portion is 3 to 50% greater than that of the peripheral portion.

3. The radiation image conversion panel of claim 1, wherein the phosphor layer comprises columnar crystals of an alkali halide phosphor.

4. The radiation image conversion panel of claim 3, wherein the columnar crystals of an alkali halide photostimulable phosphor comprise CsBr type columnar crystals.

5. A method of preparing a radiation image conversion panel of claim 1, wherein a sublayer is formed by allowing a coating solution to drop onto a support and spin-coating the dropped coating solution on the support through a centrifugal force.

6. The method of claim 5, wherein the coating solution comprises a thermoplastic resin.

7. The method of claim 1, wherein
the phosphor layer comprises columnar crystals of an alkali halide phosphor represented by formula (1):

$$M^1X \cdot aM^2X'_2 \cdot bM^3X''_3 : eA \qquad \text{formula (1)}$$

wherein
$M^1$ is at least one alkali metal atom selected from the group consisting of Li, Na, K, Rb and Cs;
$M^2$ is at least one divalent metal atom selected from the group consisting of Be, Mg, Ca, Sr, Ba, Zn, Cd, Cu and Ni;
$M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X', and X'' are each at least one halogen atom selected from the group consisting of F, Cl, Br and I atoms;
A is at least one metal selected from the group consisting of Eu, Tb, In, Ce, Tm, Dy, Pr, Ho, Nd, Yb, Er, Gd, Lu, Sm, Y, Tl, Na, Ag, Cu and Mg; and
a, b and e are $0 \leq a < 0.5$, $0 \leq b < 0.5$ and $0 < e \leq 0.2$, respectively.

8. The method of claim 1, wherein
the phosphor layer is a photostimulable phosphor layer.

* * * * *